Nov. 16, 1943.  R. M. HVID  2,334,328
CONTROL MECHANISM
Filed March 6, 1940  5 Sheets-Sheet 1

INVENTOR.
Rasmus M. Hvid
BY Thiess, Olson & Mecklenburger
ATTORNEYS.

Nov. 16, 1943. R. M. HVID 2,334,328
CONTROL MECHANISM
Filed March 6, 1940 5 Sheets-Sheet 2
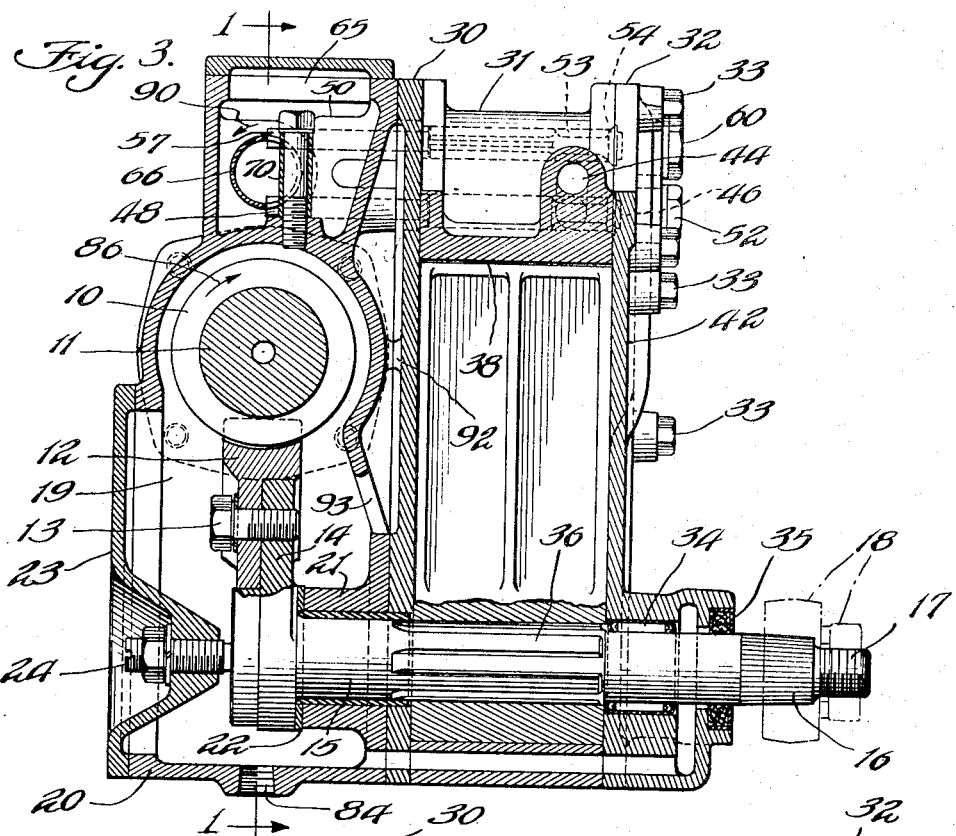
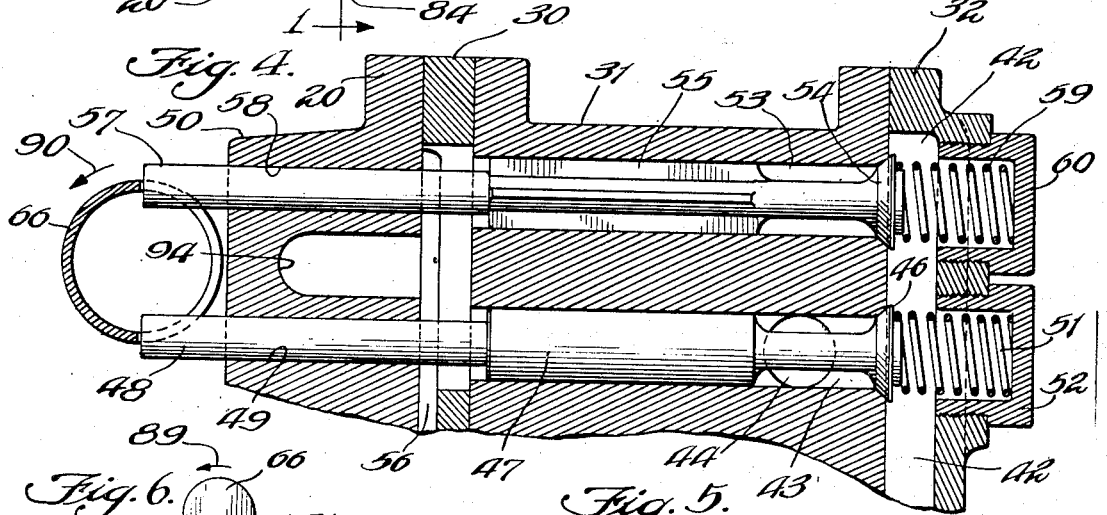
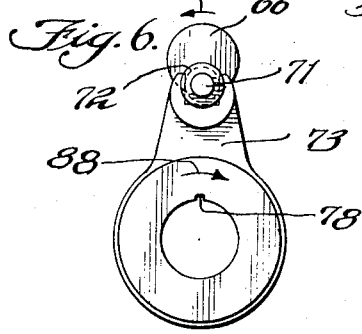
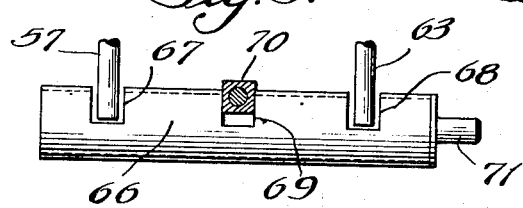
INVENTOR.
Rasmus M. Hvid
BY
Thiess, Olson & Mecklenburger
ATTORNEYS.

INVENTOR.
Rasmus M. Hvid
BY Phiess, Olson & Mecklenburger
ATTORNEYS

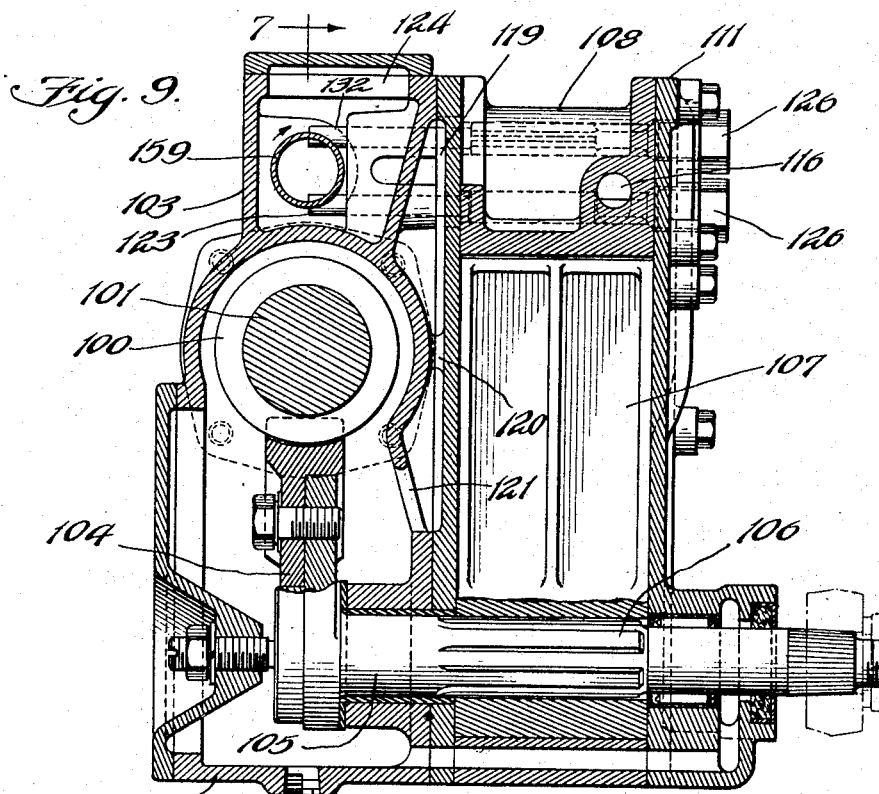
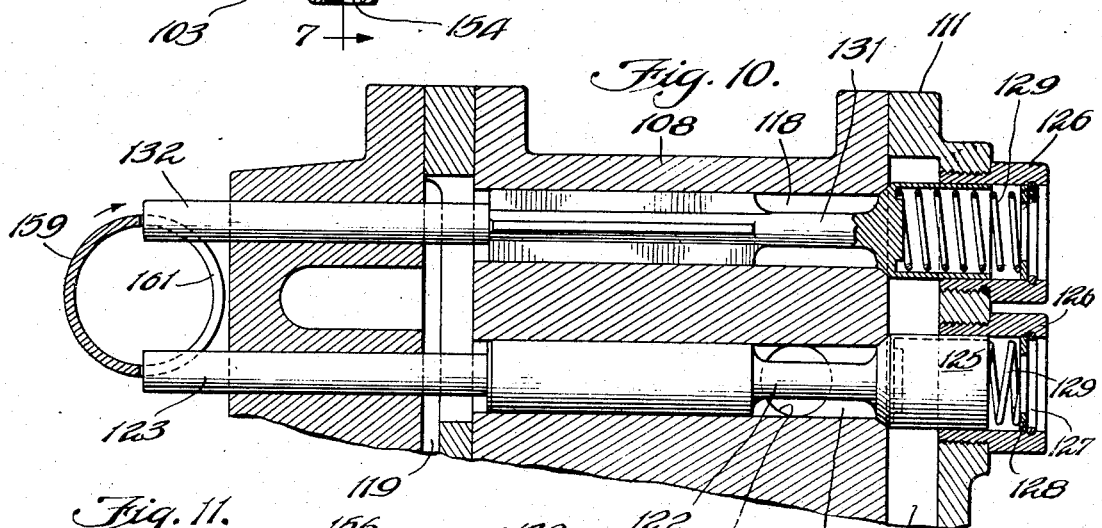
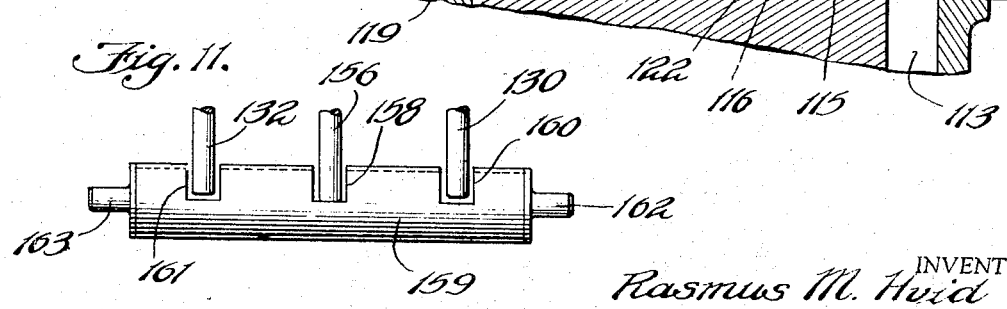

Nov. 16, 1943.  R. M. HVID  2,334,328
CONTROL MECHANISM
Filed March 6, 1940  5 Sheets-Sheet 5
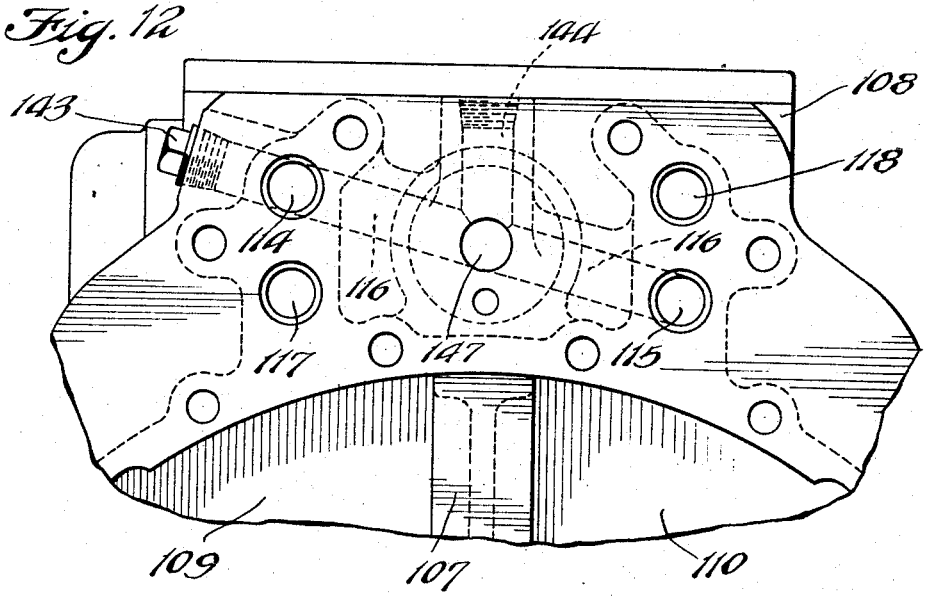
Fig. 12
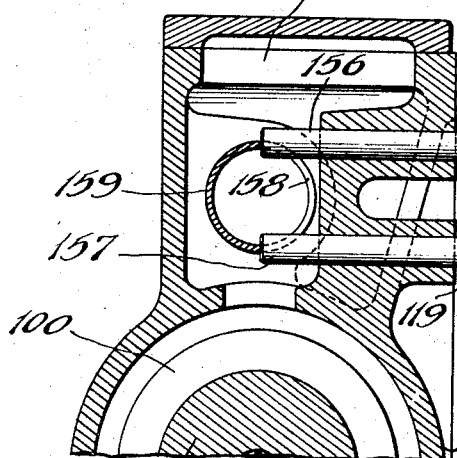
Fig. 14
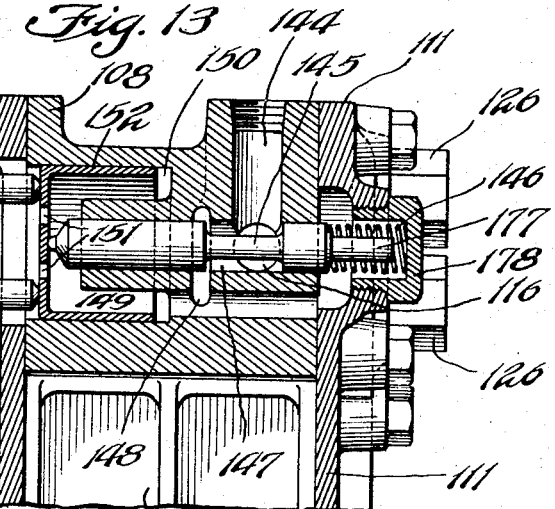
Fig. 13
Fig. 15
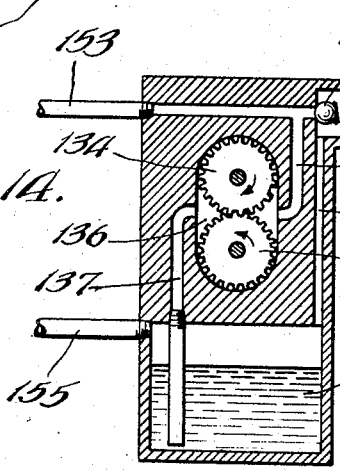
INVENTOR.
Rasmus M. Hvid
BY Thiess, Olsen & Mecklenburger
ATTORNEYS.

Patented Nov. 16, 1943

2,334,328

UNITED STATES PATENT OFFICE 2,334,328

CONTROL MECHANISM

Rasmus M. Hvid, Wilmette, Ill., assignor to Edward A. McMurtry, Chicago, Ill.

Application March 6, 1940, Serial No. 322,549

18 Claims. (Cl. 180—79.2)

My invention relates to control mechanisms, more particularly to fluid pressure mechanisms and apparatus wherein fluid pressure means are arranged to effect power operation and control of a driven member in accordance with the movements and the positioning of a selectively operable control member, and my invention has for an object the provision of mechanism and apparatus of this character that is compact, simple and economical in its construction, and efficient and reliable in its operation.

Although my invention is susceptible of a wide variety of uses wherein controlled power operation of a driven element is desired, it is particularly applicable to steering mechanisms and is herein shown and described as applied to a conventional steering gear for an automobile. In the operation of many types of automotive vehicles, particularly large trucks or busses, it is desirable to incorporate such power operating means in the steering mechanism in order that it may be controlled by the manually operable steering wheel. To be entirely satisfactory, the power operating means used in connection with such steering mechanisms should comprise a relatively small number of moving parts, should reliably impart to the steering mechanism a controlled movement corresponding to the manual movements of the steering wheel, and should preferably operate to lock the steering mechanism in any desired position, upon operation thereto, so as to prevent accidents to the vehicle due to blowouts, punctures or inequalities in the road surface and so as to prevent the transmission of road shocks to the steering wheel.

So far as I am aware no power operating mechanism heretofore provided is capable of fully meeting all of the necessary requirements without resorting to excessively expensive and complicated constructions, and accordingly it is a further object of my invention to provide a compact and simple mechanism of this character which may readily be associated with a standard steering mechanism without altering the mechanism to such a degree as to interfere with the normal mechanical steering operation in the event of a failure in the supply of the power operating medium.

In carrying out my invention in one form, I provide, in connection with a standard steering mechanism having a manually movable control member, a driven member, and the usual driving connection therebetween, a sealed casing divided into two compartments by a movable vane or wall which is operatively connected to the driven member independently of the manual driving connection. Associated with each of the compartments for selectively admitting or exhausting a fluid medium under pressure to effect controlled movement of the vane within the chamber, or for simultaneously sealing the two compartments so as to lock the movable vane against movement within the chamber, I provide a plurality of independently operable valves, and means are provided, associated with the control member of the steering mechanism, for selectively operating the valves in accordance with the movements of the control member.

For a more complete understanding of my invention, reference should now be had to the drawings, in which:

Fig. 3 is a sectional view taken along the line 3—3 of Fig. 1;

Fig. 4 is an enlarged fragmentary sectional view taken along the line 4—4 of Fig. 2;

Figs. 5 and 6 are detail views of certain valve operating members;

Fig. 9 is a sectional view taken along the line 9—9 of Fig. 7;

Fig. 10 is an enlarged fragmentary sectional view taken along the line 10—10 of Fig. 8;

Fig. 11 is a detail view of a portion of the valve operating mechanism;

Fig. 12 is a fragmentary rear view of the apparatus shown in Fig. 7, with the rear cover plate removed in order more clearly to illustrate the constructional details;

Fig. 13 is an enlarged sectional view taken along the line 13—13 of Fig. 8;

Fig. 14 is a somewhat diagrammatic view of a pumping mechanism for supplying fluid medium under pressure when an independent source of pressure is used for operation of the mechanism illustrated in Figs. 7 to 13, inclusive; and Fig. 15 is a somewhat diagrammatic representation of another embodiment of my invention.

Figure 1:
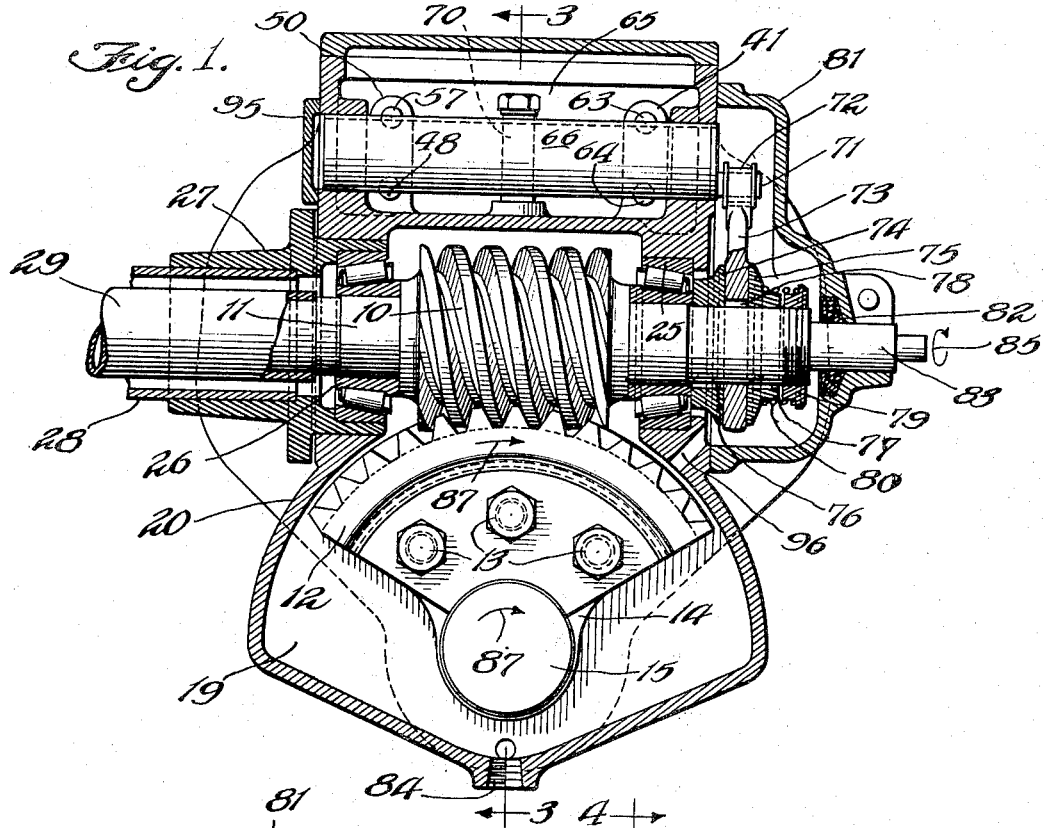
Fig. 1 is a sectional view of a steering mechanism provided with power operating means embodying my invention, the section line being taken along the line 1—1 of Fig. 3 and certain parts being shown in elevation.

Referring first to Figs. 1 to 6, inclusive, of the drawings, I have shown my invention as applied to a standard steering gear or mechanism including a worm 10 integral with a worm shaft 11 and adapted to mesh with a gear segment 12 which is secured by suitable bolts 13 to an extending segmental portion 14 on one end of a shaft 15. The other end of the shaft 15 is provided, as shown in Fig. 3, with a serrated tapered portion 16 and a threaded end portion 17 for connection to the usual steering arm and reach rod of the steering mechanism, a portion of a suitable arm and a nut for securing the arm to the shaft 15 being diagrammatically indicated in Fig. 3 by broken lines 18.

As shown in Figs. 1 and 3 particularly, the worm 10 and worm gear segment 12 are positioned within a chamber 19 formed by a suitable housing 20, and the shaft 15 is journaled in a hub 21 which extends inwardly from one wall of the housing, the opposite wall of the housing having an opening therein through which the gear segment 12 and the shaft 15 may be inserted so that the extending portion 14 of the shaft abuts the end of the hub 21. A suitable bearing member 22 is preferably interposed between the portion 14 and the end of the hub 21, and a cover 23, which is adapted to close the opening in the opposite wall of the housing, carries an adjustable abutment member 24 which serves properly to position the shaft 15 and the gear segment 12 relative to the hub 21.

The worm shaft 11 extends through suitable apertures in the opposite walls of the housing 20, as shown in Fig. 1, and is journaled in roller bearings 25 and 26, the bearing 25 being supported in one wall of the housing, and the bearing 26 being carried by a tubular connecting member 27 which is secured to the housing and is connected to a tubular casing 28 through which extends the steering post 29, which steering post is connected at one end to the worm shaft 11 and is provided at its opposite end with the usual hand steering wheel (not shown).

The mechanism thus far described is in all material respects similar or identical to the usual or standard type of steering mechanism utilized in automotive vehicles. The steering post 29 constitutes a selectively movable control member, the shaft 15 constitutes a driven member, and the worm and gear segment constitute a driving connection therebetween for operating the driven member in accordance with the movements of the control member. In accordance with my invention, fluid operating means are provided for controlling and operating the shaft 15 in accordance with the movements of the steering post 29, such fluid operating means including a sealed chamber containing a movable vane directly connected to the shaft 15, and valve means controlled by the movement of the steering post 29 for properly controlling the supply and discharge of fluid pressure to and from the sealed chamber in order to move or to restrain movement of the shaft 15.

As shown in Figs. 1 to 4, inclusive, I provide an intermediate plate 30, a second housing 31, and a rear cover plate 32, all of which parts are secured to the housing 20 by suitable bolts 33. The housing 31 is shaped, as shown best in Fig. 2, to provide a chamber therewithin, one wall of which is formed by the intermediate plate 30 and the opposite wall of which is formed by the rear cover plate 32, the parts 30 and 32 having suitable apertures therein, as shown best in Fig. 3, for permitting the shaft 15 to extend through the lower portion of the chamber in the housing 31. An antifriction bearing 34, is provided for the shaft 15, and suitable sealing means 35 are disposed in the rear cover plate 32 surrounding the shaft 15 so as to effectively prevent leakage of the operating fluid to the outside of the mechanism.

Figure 2:
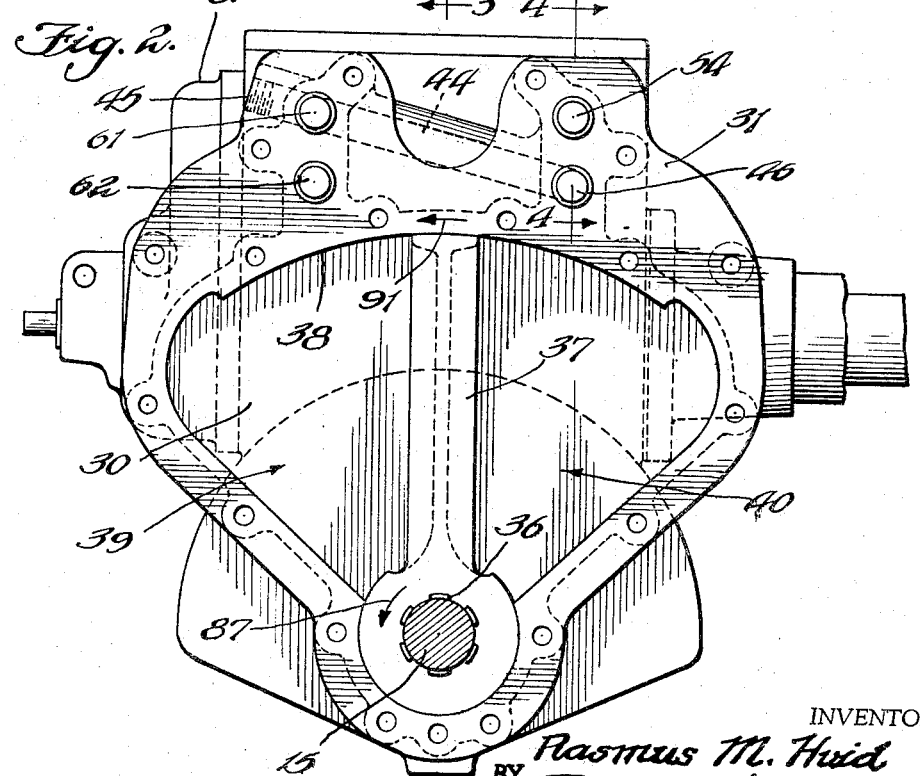
Fig. 2 is a rear view of the device shown in Fig. 1, the rear cover plate having been removed in order to illustrate more clearly the constructional details.

The portion of the shaft 15 which extends through the sealed chamber is splined, as indicated by the reference numeral 36 in Figs. 2 and 3, so as to provide a driving connection with a movable vane 37 which is mounted thereon. This vane 37 is accurately machined so as to provide a close running fit between the opposite edges thereof and the plates 30 and 32, respectively, and between the upper end of the vane and the arcuate wall 38 on the housing 31. This vane 37, as shown best in Fig. 2, constitutes a movable wall which divides the chamber within the housing 31 into two sealed compartments 39 and 40, respectively, and it will be apparent that when a fluid medium under pressure is introduced into either of the compartments 39 or 40 and when the exhaust of fluid medium from the opposite compartment is permitted, the vane 37 will be operated so as to rotate the shaft 15 in one direction or the other. Similarly, it will be apparent that when both of the chambers 39 and 40 are filled with a noncompressible fluid medium under pressure and sealed against inlet and discharge of such fluid, the vane 37 will be locked in whatever position it then occupies and will thus prevent rotation of the shaft 15.

To provide for the admission of a suitable fluid medium under pressure to the chambers 39 and 40 so as properly to control the movements of the vane 37, the rear cover plate 32 is provided with a pair of passageways 42 which respectively communicate with the compartments 39 and 40, only one of the passageways 42 being shown in Figs. 3 and 4. These passageways 42 correspond in configuration and arrangement to passageways 112 and 113, shown in Fig. 8, which figure illustrates what is now believed to be a preferred embodiment of my invention.

Communicating with the upper portion of the passageway 42, is an inlet port 43 (Fig. 4) which extends transversely through the housing 31 and is intersected by a cross passageway 44, the passageway 44 terminating, as shown best in Fig. 2, in an open threaded end 45 which is adapted to be connected to a suitable source of fluid medium under pressure. The intersection of the inlet port 43 with the passageway 42 is beveled, as shown best in Fig. 4, to provide a valve seat for the head of a valve 46, the stem of which extends into the port 43 and is provided with an enlarged portion 47, slidably disposed in the port 43 beyond the intersection of the port with the passageway 44. This portion 47 effectively seals the inlet port 43 against leakage of the fluid under pressure and is engaged by a valve tappet 48 which extends through a suitable aperture in the plate 30 and through a guide bearing 49 formed in a portion 50 of the housing 20.

It will be apparent upon inspection of Fig. 4, that valve 46 provides a substantially balanced arrangement, since the right-hand end of the enlarged portion 47 presents substantially the same surface area as does the underside of the valve head to the fluid pressure medium entering through the passageway 44. Normally, the valve 46 is maintained in engagement with its valve seat by a valve spring 51, one end of which engages the valve head and the other end of which engages a socket formed in a nut, or closure member, 52 that is threaded into a suitably located aperture in the rear cover plate 32.

Adjacent to the port 43 I provide an exhaust port 53 which extends transversely through the casing 31 and intersects the passageway 42 in rear cover plate 32 to provide a valve seat adapted to be engaged by the head of an exhaust valve 54. The stem of the valve 54 is provided with a plurality of ribs 55 which serve to guide the exhaust valve in the port 53. The spaces between ribs 55 permit the flow of fluid medium through the exhaust port 53 which terminates at its end opposite the valve seat in passageway 56 formed in the plate 30. The exhaust valve 54 engages a valve tappet 57 which extends through a guide bearing 58 in the portion 50 of the wall of the housing 20, and the exhaust valve 54 is normally maintained in engagement with its valve seat by a valve spring 59, one end of which engages a suitable socket in a closure member 60 which is similar to the nut 52.

It will now be apparent that when the valves 46 and 54 are both closed, the passageway 42 and the compartment 40 within the casing 31 are tightly sealed against the entrance or exhaust of fluid medium. Opening of the valve 46 permits fluid medium under pressure to flow into the compartment 40 through the passageways 44, 43, and 42, while opening of the exhaust valve 54 permits the fluid medium to be exhausted from the compartment 40 through the passageways 42, 53, and 56.

As indicated in Figs. 1 and 2, similar inlet and exhaust valves 61 and 62, respectively, are associated with the other passageway 42, which terminates in the compartment 39. The valves 61 and 62 are respectively identical with the valves 46 and 54 and need not be described in detail, the positions of the valves being reversed, as indicated in Fig. 2, so that inlet valve 61, which is disposed in an inlet port which intersects the passageway 44, is positioned above the exhaust valve 62, this reversal of positions providing for proper sequential operation as will be more fully set forth hereinafter.

In Fig. 2 the heads of the valves 61 and 62 are shown and it will be understood that the other ends of each of these valves contact with a valve tappet similar to the ones for valves 46 and 54. These valve tappets, indicated by reference numerals 63 and 64 in Fig. 1, extend through a guide portion 41 formed on the wall of the casing 20 and similar to the guide portion 50 through which the valve tappets 48 and 57 for valves 46 and 54 extend.

The valve tappets 48, 57, 63, and 64 for the heretofore described valves extend, as shown best in Figs. 1 and 3, into a chamber 65 in the upper portion of the housing 20, and a valve operating member 66, which is in the form of a hollow cylinder, is disposed in this chamber 65 adjacent the ends of the valve tappets, the member 66 being journaled in the opposite walls of the chamber 65, as shown best in Fig. 1. Directly opposite the valve tappets the cylindrical member 66 is provided with slots 67 and 68, respectively, the slot 67 being positioned to receive the valve tappets 48 and 57 and the slot 68 being positioned to receive the valve tappets 63 and 64, so that upon rotation of the cylindrical member 66 the end walls of the slots will engage the associated valve tappets to effect reciprocating operation of the valves.

Intermediate the slots 67 and 68, the cylindrical member 66 is provided with a slot 69 into which extends a stop member 70 which is rigidly supported on the bottom wall of the chamber 65, and which functions to limit the extent of rotation which may be imparted to the cylindrical member 66.

Adjacent one end, the cylindrical valve operating member 66 is provided with an eccentrically disposed pin 71 on which is mounted a roller or collar 72 (Figs. 1 and 6) that is adapted to be engaged by the bifurcated upper end of a valve operating arm 73, the lower end of which is apertured to receive the extending end of the worm shaft 11. As shown best in Fig. 1, the right-hand end of the worm shaft 11, which extends through the operating arm 73 and is free to rotate relative thereto, carries a pair of disc members 74 and 75, respectively, disposed on opposite sides of the member 73. Disc members 74 and 75 are mounted on the shaft 11 for sliding movement thereof along the shaft but are keyed to the shaft for rotation therewith, each of the members being provided with a groove 76 (Fig. 1) for receiving a key 77 that extends outwardly from one side of the shaft 11. In order to provide for assembly of the discs 74 and 75 and the member 73 on the shaft 11, member 73 is provided with a notch 78 which permits the member 73 to be assembled from the end of the shaft, the key 77 which is arranged to cooperate with the disc member 75 passing through the notch 78 during such assembly.

Disc 74 abuttingly engages the bearing member 25 in which the worm shaft 11 is journaled, and in order to maintain the members 73, 74, and 75 properly assembled, with the friction members 74 and 75 engaging the opposite faces of the member 73 in tight frictional engagement, I provide a nut 79 which threadedly engages the outer end of the shaft 11 and supports one end of a coil spring 80, the opposite end of which engages the friction disc 75. Preferably, the valve operating parts, which form the connection between the worm shaft 11 and the cylindrical valve member 66, are enclosed within a cover member 81 secured to one face of the casing 20, and a suitable packing member 82 is provided for preventing leakage about the outer reduced end portion 83 of the shaft 11, which end portion extends through an aperture in the cover member 81.

Having in mind the above description of the various parts of my improved apparatus, it is now believed that a complete understanding of my invention may be had from a description of its operation. While any suitable source of fluid pressure may be utilized in carrying out my invention, it may be preferable, in the application of my invention to steering mechanisms for automobiles, to utilize as a source of fluid pressure the oil or lubricating pump which normally supplies oil under pressure to the engine lubricating system of the vehicle. This of course may be accomplished only where the engine lubricating system has sufficient excess capacity so that the normal lubricating functions thereof will not be impaired by tapping off a portion of the oil under pressure. Other arrangements for providing a suitable source of fluid medium under pressure will be hereinafter described in connection with Figs. 7 to 14, inclusive.

Assuming that the engine lubricating system is to be used, it is necessary, in carrying out my invention, to connect by suitable conduits the open threaded end 45 of the passageway 44 to the pressure side of the engine lubricating system and to similarly connect the chamber 19 which, as shown in Fig. 1, is provided with a threaded drain port 84 to the crank case of the automotive engine, so that the operating fluid will be returned to the lubricating system.

For the purpose of describing the operation of the embodiment of my invention shown in Figs. 1 to 6, inclusive, it will be assumed that the above-mentioned conduits have been installed, that the compartments 39 and 40 and the passageways 42 are filled with oil, and that the valves, and the operating parts therefor, occupy the positions illustrated in the drawing, with the vane 37 in the vertical position shown in Fig. 2, which position corresponds to the straight-on position of the vehicle. If it is now desired to turn the vehicle, rotation of steering post 29 is effected by means of the usual steering wheel (not shown) attached to the upper end of the steering post, and it will be assumed that the rotation is in the direction indicated by arrows 85 and 86 in Figs. 1 and 3, respectively.

Rotation of the steering post 29 and the worm shaft 11 in this direction tends to operate the gear segment 12 and the shaft 15 in the direction indicated by the arrows 87 in Fig. 1, and at the same time the friction discs 74 and 75 effect movement of the arm 73 in the direction indicated by the arrow 88 in Fig. 6. Movement of the arm 73 in this direction causes the cylindrical valve member 66 to be rotated in its bearings in the direction indicated by arrow 89 in Fig. 6 and by arrow 90 in Fig. 3.

In order to permit a slight play or free movement of the steering wheel without effecting operation of the control valves, a small clearance is provided between the ends of slots 67 and 68 in the cylindrical member 66 and the ends of the valve tappets which extend into these slots, and accordingly a slight initial movement of the steering wheel in either direction will not effect operation of the valve members which control the fluid operating means. Preferably, the clearance provided for this purpose corresponds substantially to the backlash which exists between the worm 10 and the gear segment 12.

Continued turning movement of the steering wheel in the direction indicated effects continued rotation of cylindrical valve member 66 so as to engage the valve tappets 48 and 64 for the inlet valve 46 and the exhaust valve 62 respectively, whereupon these valves are opened and oil under pressure is admitted through ports 44, 43, and 42 to sealed compartment 40 on one side of vane 37. The vane 37 thereupon moves in the direction of the arrow 91 in Fig. 2 to rotate the shaft 15 in a counterclockwise direction, as viewed in Fig. 2, which of course corresponds to clockwise movement of the gear segment 12 as viewed in Fig. 1. Movement of vane 37 in this direction is permitted due to the fact that the body of oil contained in the compartment 39 on the opposite side of the vane will be exhausted through its associated passageway 42 and the exhaust valve 62 which is now in its open position. From valve 62 the oil is exhausted into the passageway 56, suitable ports or apertures 92 and 93 being provided as shown in Fig. 3 for permitting the exhausted oil to flow into chamber 19 from whence it may return to the engine lubricating system through the connection 84. Some of the exhausted oil also flows by way of passageways 94 (Figs. 3 and 4), one of which is located in each of the bearing portions 50 and 41, into chamber 65 so that the valve parts contained therein may be effectively lubricated.

Leakage of the oil contained in chamber 65 through the bearings for valve member 66 may of course occur and accordingly the bearing at the left-hand end of the member 66, as shown best in Fig. 1, is tightly sealed by cap 95. The right-hand bearing for member 66 is enclosed by the cover 81, and any oil passing thereinto is returned to chamber 19 through a port 96 (Fig. 1).

Movement of vane 37 in the direction indicated by the arrow 91 in Fig. 2 continues so long as steering post 29 and the worm shaft 11 continue to rotate in the direction of the arrows 85 and 86, and although the stop 70 arrests cylindrical valve member 66 in a position corresponding to the full open position of the valves 46 and 62, the frictional connection between the arm 73 and the discs 74 and 75 permits continued rotation of shaft 11 even though the member 66 is held against further movement.

In order to arrest the movement of the vane 37 and the shaft 15 which is connected to the vehicle wheels, only a slight retractive movement of steering post 29 is required, this retractive movement causing a corresponding retractive movement of the cylindrical valve member 66 to the position shown in Figs. 3 and 4, whereupon the valves 46 and 62 close so as to seal both compartments 39 and 40 and lock the vane 37 in the position to which it has moved.

Rotation of steering post 29 in the opposite direction will of course effect return movement of the vane 37 toward or beyond its initial position, since this opposite rotation causes movement of the arm 73 and the cylindrical valve member 66 in a direction such as to open the exhaust valve 54 and the inlet valve 61, whereupon oil under pressure is introduced into the compartment 39 and exhausted from the compartment 40, movement of the cylindrical valve member in this direction again being arrested by engagement of stop 70 with the opposite end of the notch 69.

It will be observed that a simple and reliable power operation of the steering gear is thus provided and if the oil pressure should fail, proper steering may be accomplished through the worm and gear segment. All of the valves continue to operate as usual and, accordingly, even if the mechanism is full of oil when the pressure fails, the oil will be gradually worked out and full manual control of the steering operation is maintained at all times.

In order to provide quick and accurate response of the various valves to rotational movement of the shaft 11, without imposing excessive strains or reactive forces on any of the parts, compression spring 80, which maintains the frictional engagement between the discs 74 and 75 and the arm 73, is so correlated with the valve springs which normally maintain the valves closed, as to insure that the force exerted on the valve tappets by the cylindrical member 66 will effect proper operation of the valves, while at the same time the force exerted by the spring 80 will permit slippage between the parts 73, 74, and 75 when the member 66 engages the stop 70. In this connection, it has been pointed out that inlet valves 46 and 61 are of the substantially balanced type, but it will be observed, upon inspection of Fig. 4, that the oil pressure within the passageways 42, exerts a force on the end surfaces of the valve heads which tends to maintain both the inlet and the exhaust valves closed. In some instances where a more perfectly balanced valve arrangement is desired, it may be advisable to utilize valve constructions of the type illustrated in Fig. 10 which will be more fully described in connection with the preferred embodiment of my invention therein illustrated.

While the embodiment of my invention thus far described provides satisfactory power operation of the steering mechanism, certain reactive forces may be encountered which in some installations may be considered undesirable. For example, if during a turning movement the vane 37 moves faster than the travel of the thread on worm 10, the gear segment 12 may over-travel with respect to the worm and take up all of the backlash which normally exists between the leading surfaces of the teeth on the gear segment and the rear surfaces of the thread on the worm. In such a case the retractive movement necessary to arrest the movement of the vane 37 or the initial opposite rotation necessary to effect return movement of the vane, would be resisted by the teeth on gear segment 12 and might require the exertion of a greater force on the steering wheel than is normally desirable. This force in most circumstances would not be very great because of the self-straightening tendency of the front wheels which tends to cause a reverse movement of gear segment 12, and because of the large mechanical advantage which is obtained through a worm and gear type drive.

In the embodiment of my invention illustrated in Figs. 7 to 14, inclusive, provisions are made to prevent such over-travel of the segment gear and the vane as might result in the above described conditions.

Referring now to Figs. 7 to 14, inclusive, the embodiment of my invention here shown is in many respects similar to the embodiment before described and includes a worm 100 integral with a worm shaft 101 which is journaled in bearings 102 in a housing 103, the worm being arranged to mesh with a gear segment 104 mounted on the end of a shaft 105, the detailed arrangement of these parts being in general similar to the corresponding parts heretofore described. As shown in Fig. 9, the shaft 105 is provided with a splined portion 106 on which is mounted a vane 107 which is movable within a chamber formed within a second housing 108, the vane 107 dividing the chamber into a plurality of sealed compartments 109 and 110.

Figure 8:
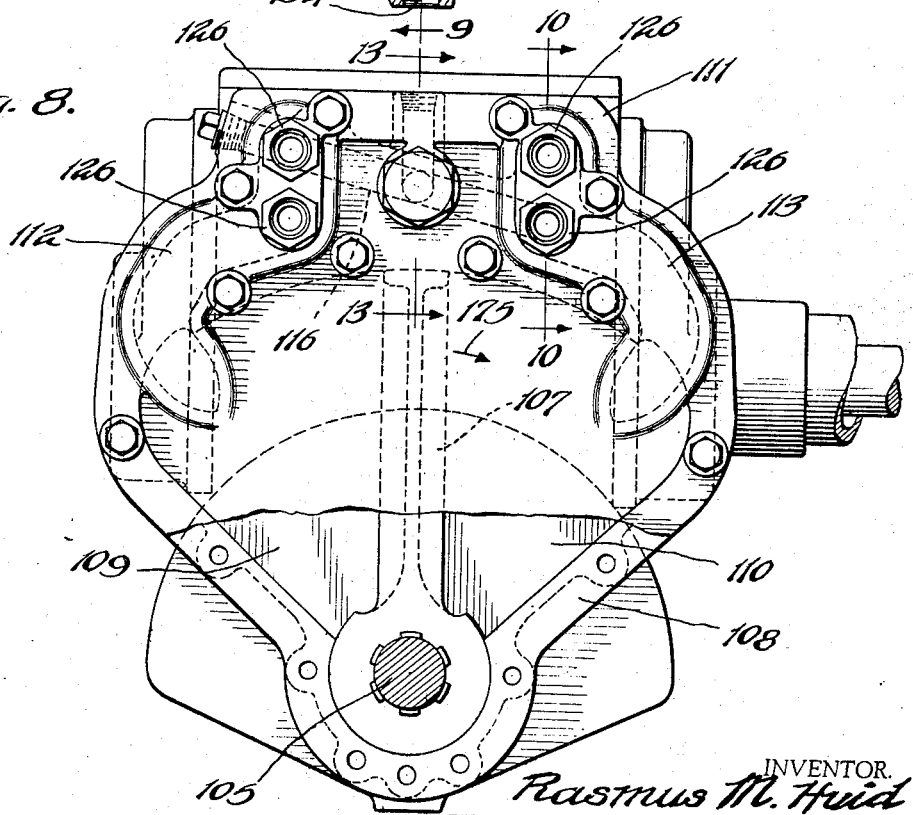
Fig. 8 is a rear view of the construction shown in Fig. 7, a portion of the rear cover plate being broken away.

A rear cover plate 111, which is secured to the rear face of the housing 108 and forms the rear wall of the two compartments 109 and 110, is provided, as shown best in Figs. 8 and 9, with a pair of passageways 112 and 113 which respectively extend from compartments 109 and 110 and serve the same function as passageways 42 referred to above in connection with Figs. 1 to 6. Formed in the upper portion of the housing 108, I provide a pair of inlet ports 114 and 115 which respectively terminate in the passageways 112 and 113, and which are intersected intermediate their ends by a cross passageway 116 through which fluid under pressure is supplied to the opposite sides of the vane 107 under the control of suitable valves. In addition, a pair of exhaust passageways 117 and 118 are provided which respectively terminate in the passageways 112 and 113, and which communicate at their opposite ends with an exhaust passageway 119. The passageway 119, as shown best in Fig. 9, is connected through suitable ports 120 and 121 with the chamber in the housing 103 which contains worm 100 and gear segment 104.

The inlet port 115, as shown in Fig. 10, is provided with an inlet valve 122 which engages a valve tappet 123 that extends into a suitable valve operating chamber 124 (Figs. 7 and 9) formed in the housing 103. The valve 122 differs from the heretofore described valves in that the head of the valve is provided with an outwardly extending sleeve or skirt 125 which extends across passageway 113 and is slidingly fitted in a tubular nut 126, the outer end of which is open to the atmosphere. Positioned within the tubular nut 126 is a retaining ring 127 and a washer 128 which support one end of a valve spring 129, the other end of the valve spring being arranged to bear against the head of the valve.

By reason of this valve construction a balanced arrangement is obtained since the pressure of the fluid within passageway 113 exerts no closing force on the valve head. Although such expedients will normally not be necessary, it will be apparent that if desired suitable conduits may be provided for returning to the pressure system any of the fluid medium under pressure which may leak around the sleeve 125 and out through tubular nut 126.

Figure 7:
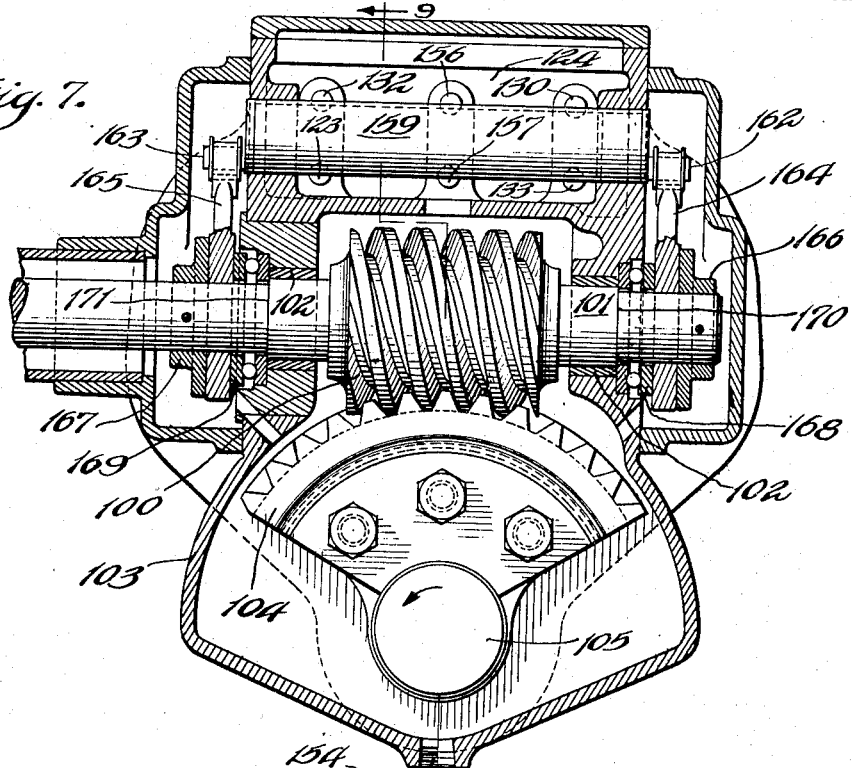
Fig. 7 is a sectional view similar to Fig. 1 of a steering mechanism provided with a similar power operating means, and which I now consider the preferred embodiment of my invention, the section line of Fig. 7 being taken along the line 7—7 of Fig. 9.

It will of course be understood that the other inlet port 114 is provided with a valve identical with valve 122. In Fig. 7 the valve tappet 130 for such an inlet valve is shown. Likewise, each of the exhaust ports 117 and 118 is provided with suitably balanced exhaust valves having valve tappets which extend into the valve operating chamber 124. The exhaust valve 131, which is associated with valve port 118, and its valve tappet 132 are shown in detail in Fig. 10, and the valve tappet 133 for the valve associated with the exhaust passageway 117 is shown in Fig. 7.

As heretofore indicated, it is desirable in this embodiment of my invention to supply a fluid operating medium under pressure from a source of pressure other than the engine lubricating system of the vehicle, and in Fig. 14 I have shown, somewhat diagrammatically, a pressure pump which may be utilized in carrying out my invention. This pressure pump is of the gear type and includes a pair of oppositely rotated gears 134 and 135, respectively, disposed within a chamber 136. One side of the chamber is connected through a suitable conduit 137 to a fluid reservoir 138, and the opposite side of the chamber is provided with outlet conduit 139. It will be apparent that when the gears 134 and 135 are driven in the direction indicated by the arrows in Fig. 14, the fluid medium will be drawn through conduit 137 from reservoir 138 and discharged through the outlet conduit 139. The pressure developed by a gear pump constructed as shown in Fig. 14 of course depends upon the resistance encountered, and in order to prevent the building up of pressures of excessive magnitude a safety valve comprising a spring-pressed ball 140 is associated with the outlet conduit 139. This safety valve 140 may be adjusted by means of the spring 141 to open at any desired maximum pressure and permit return of the escaping fluid medium to reservoir 138 through the by-pass conduit 142.

It will also be understood, of course, that the power required to drive the gear pump depends upon the magnitude of the fluid pressure developed by the pump, as well as upon its volumetric capacity, and accordingly I provide means for permitting the pump to operate normally at a low head pressure while at the same time insuring that a pressure of sufficient magnitude to effect proper operation of vane 107 will at all times be available when desired.

As shown in Figs. 12 and 13, the passageway 116 is closed at its threaded end by a plug 143 and is intersected intermediate its ends by an inlet passageway 144. Associated with the intersection of passageways 116 and 114 I provide control valve 145 of the balanced type, as shown, and which is normally held in the position shown in Fig. 13 by a spring 146. So long as the valve 145 occupies the position shown in Fig. 13, the fluid medium entering through passageway 144 flows through a by-pass 147, through suitable connecting passageways 148 and 149 into a chamber 150 formed in the upper portion of the casing 108, and through suitable apertures 151 in the end wall of a cup member 152, into the exhaust passageway 119, from which point it is exhausted into the chamber containing the worm 100 and gear segment 104. It is thus apparent that when the inlet port 144 is connected by a suitable conduit, as for example by the conduit 153, to the outlet side of the gear pump and the threaded outlet port 154 in the bottom of the casing 103 is connected by conduit 155 to the reservoir 138, fluid medium circulates through a substantially unobstructed path and the pump therefor operates against a nominal head pressure and requires but little power for its operation.

Movement of the valve member 145 in a right-hand direction, as viewed in Fig. 13, is effective, however, to close by-pass 147, whereupon the fluid pressure developed by the pump immediately builds up to the required value, up to the maximum determined by the setting of the safety valve 140. In order to effect such operation of the valve 145 when it is desired to operate the steering mechanism of the vehicle, the left-hand end of the valve 145 is arranged to contact the end wall of the slidable cup 152 and a pair of valve tappets 156 and 157, respectively are provided for abuttingly engaging and operating the cup, the opposite ends of the valve tappets 156 and 157 being disposed in a suitable notch 158 (Fig. 11) in a cylindrical valve operating member 159, which is also provided with notches 160 and 161, respectively, for receiving valve tappets 130 and 123 for the inlet valves and the valve tappets 133 and 132 for the exhaust valves.

This cylindrical valve operating member 159 is in general similar to valve operating member 66, described in connection with Figs. 1 to 6, but differs therefrom in that it is provided at both ends with extending eccentrically located pins 162 and 163 adapted to be engaged by the upper ends of a pair of valve operating arms 164 and 165, respectively, as shown best in Fig. 7.

The cylindrical valve operating member 159 is disposed within the chamber 124 in housing 103 and is journaled in the opposite walls of the housing 103 so that the pins 162 and 163 and the associated operating arms 164 and 165 are disposed on opposite sides of the housing, each of the arms having an aperture adjacent its lower end through which extends the worm shaft 101. Rigidly secured to the worm shaft and positioned outwardly of the arms 164 and 165, I provide a pair of friction discs, 166 and 167 respectively, and suitable thrust bearings 168 and 169 are respectively disposed inwardly of the arms 164 and 165 for engaging suitable shoulders 170 and 171 on worm shaft 101.

For a purpose which will be more fully described hereinafter, the thrust bearings 168 and 169 and the friction discs 166 and 167 are so arranged as to permit a very slight end play of worm shaft 101, which play may be on the order of a few thousandths of an inch. When the worm 100 and the worm shaft 101 are perfectly centered with respect to the arms and the thrust bearings, there is no frictional force exerted on the arms 164 and 165 by the friction members 166 and 167, but endwise movement of the worm shaft 101 in either direction will effect frictional contact between one of the arms and its associated friction disc so as to cause rotation of cylindrical member 159. Thus, upon a slight movement toward the left, as viewed in Fig. 7, the arm 164 is operated when worm shaft 101 rotates, while upon a slight movement to the right the arm 165 is operated when the worm shaft rotates.

Having in mind the above description of the various parts of this preferred embodiment of my invention, it is now believed that a complete understanding will readily be obtained from a description of the operation. In order to describe such operation, it will be assumed that the chamber containing the vane 107 is filled with fluid, that the pump shown in Fig. 14 is being driven so that gears 134 and 135 rotate in the directions indicated by the arrows, that the inlet and exhaust valves occupy their closed positions, and that the by-pass valve 145 occupies the position shown in Fig. 13. Under these conditions, the fluid medium supplied by the pump, which fluid medium is preferably oil, circulates through the system and through the by-pass valve at low pressure so that a minimum load is imposed on the pump.

If it is now desired to turn the vehicle in a direction corresponding to a counterclockwise rotation of the worm shaft 101, as viewed in Fig. 9, it is only necessary to rotate the steering post to which the worm shaft is connected in a corresponding direction. As worm 100 begins to rotate, it will be apparent that the thread of the worm engages the right-hand faces of the teeth on gear segment 104 (as viewed in Fig. 7) and an axial force will be exerted on the worm 100 tending to move the worm in a right-hand direction. This axial force creates a pressure between the friction disc 167 and the operating arm 165, and accordingly causes the cylindrical valve operating member 159 to rotate in a clockwise direction as viewed in Figs. 9, 10, and 13.

Initial movement of the cylindrical member 159 in this direction causes the valve tappet 156 to move in a right-hand direction, as viewed in Fig. 13, whereupon the by-pass valve 145 is moved so as to close the by-pass port 147 and the pressure generated by the gear pump will immediately build up to a value corresponding to the resistance encountered in steering the vehicle. Substantially zero clearance is provided between the ends of the valve tappets 156 and 157 and the ends of the notch 158 into which these valve tappets extend. A suitable clearance is provided between the ends of the various other valve tappets and the ends of the notches 160 and 161 in operating member 159 so as to insure perfect closure of these valves when required.

Continued rotation of the worm shaft 101 in the direction heretofore indicated of course causes further rotation of the valve operating member 159 so as to engage the valve tappets 130 and 132, respectively, for the inlet valve associated with passageway 112 and for the exhaust valve associated with passageway 113, and fluid under pressure is supplied to compartment 109 through the ports 144, 116, 114, and 112 and is exhausted from the compartment 110 through the passageway 113 and exhaust ports 118 and 119. As shown in Fig. 13, by-pass valve 145 is provided with an extending finger 177 adapted to engage the end wall of a cup 178 in which spring 146 is carried and serves as a stop for valve operating member 159 upon rotation of the member 159 in either direction.

Thus the vane 107 is caused to move in the direction indicated by arrow 175 in Fig. 8 so as to rotate shaft 105 in a clockwise direction, as viewed in Fig. 8, or in a counterclockwise direction as viewed in Fig. 7. So long as gear segment 104 travels at substantially the same speed as the thread of worm 100, the valve operating member 159 is held in its operated position to permit the flow of the pressure fluid through the proper inlet and exhaust valves.

If, however, gear segment 104 and the shaft 105 tend to overtravel with respect to worm 100, it will be apparent that the right-hand faces of the teeth on the gear 104 move away from the leading faces of the thread on the worm, and accordingly the pressure between the friction disc 167 and the arm 165 is sufficiently relieved to permit valve springs 129 on the inlet and exhaust valves and the spring 146 on the by-pass valve to return valve operating member 159 to the position shown in the drawings, wherein the inlet and exhaust valves will all be closed and movement of vane 107 and shaft 105 will be arrested. Continued movement of worm 100 will of course cause re-engagement of the thread of the worm with the teeth of the gear segment and will again create pressure between the friction disc 167 and arm 165 so as to open the proper inlet and exhaust valves and effect further movement of vane 107. It will thus be seen that vane 107 and shaft 105 are caused to travel with the movement of worm 100, and are prevented from such overtravel as might cause an objectionable reactive force between the gear 104 and worm 100.

Movement of vane 107 may be arrested in any desired position simply by ceasing to turn the steering wheel. This relieves the pressure between the worm thread and the gear segments and the frictional contact between 167 and 165 is thereby destroyed. Rotation of the worm 100 in a reverse direction causes the thread of the worm to engage the left-hand faces of the teeth on the gear segment 104, whereupon a force is exerted which tends to move the worm 100 and the worm shaft 101 in a left-hand direction so as to create a pressure between the friction disc 166 and the arm 164 and therefore cause rotation of the arm 164 in a direction such as to effect movement of the by-pass valve tappet 157 and to likewise effect opening movement of the inlet valve associated with the port 115 and the exhaust valve associated with port 117. Upon operation of these inlet and exhaust valves, fluid under pressure is admitted to the chamber 110 and exhausted from the chamber 109 to cause a reverse movement of the vane 107 and a reverse operation of the gear segment 104.

Inasmuch as the arms 164 and 165 are so associated with the friction discs 166 and 167 carried by the worm shaft 101 as to prevent over-travel of gear segment 104, it will be apparent that no objectionable reactive force is exerted on the worm 100, and accordingly, the steering post to which the worm shaft 101 is connected, may readily be rotated in either direction without encountering any objectionable reactive forces thereon at any time. Again, accurate control of shaft 105 and the steering mechanism is effected with a minimum force on the steering wheel, and turning movement of the vehicle wheels may be arrested and the wheels locked in any desired position simply by stopping the rotation of the steering wheel in the desired position. No retractive movement of the steering wheel is necessary to arrest further turning movement of the vehicle wheels and no excessive reactive force is exerted by the steering mechanism upon the steering wheel when it is desired to turn the vehicle in an opposite direction.

The oil pressure acting upon the vane 107 of the fluid pressure actuator is at all times a function of the turning resistance, up to the point at which the safety valve opens. If, therefore, the road resistance is very small the pump pressure is also very small and if the road resistance increases there will be a corresponding increase in the pump pressure. Assuming the volumetric efficiency and the speed of the oil pump to be constant, the speed of the movement imparted by the oil pressure to the vane 107 of the actuator is constant, up to the pressure at which the safety valve opens.

The speed at which the steering gear turns, however, may be increased or decreased simply by increasing or decreasing the speed at which the steering wheel is turned. An increase in the speed at which the steering wheel is turned of course requires increased manual effort which, directly through the worm and gear segment tends to increase the speed of turning. If the steering wheel is turned at a speed slower than normal, that is, slower than the constant speed determined by the characteristics of the fluid actuator and the pump, the pressure between the gear segment teeth and the worm thread is relieved and the friction on the control arms is destroyed. The valves of the actuator thereupon snap to their neutral or closed positions and movement of the fluid actuator stops. Continued movement of the steering wheel, however, reopens the valves and the actuator again moves under the control of the oil pressure. Accordingly, by a series of momentary movements and stops, the fluid actuator closely follows slow movement of the steering wheel, and slow turning of the vehicle steering gear is accomplished.

In Fig. 15 I have shown somewhat diagrammatically an embodiment of my invention adapted for operation from a source of compressed air or other suitable gaseous medium, the heretofore described embodiments having included a source of incompressible fluid or liquid medium such as oil. The embodiment shown in Fig. 15 comprises a movable vane 180 which divides an oil filled chamber into compartments 181 and 182, and a pair of reservoirs 183 and 184 are provided, the lower portions of which are connected to the compartments 181 and 182 by passageways 185 and 186. Inlet valves 187 and 188 are provided for selectively connecting the upper portions of the reservoirs 183 and 184 to a source of compressed air indicated diagrammatically at 190, and exhaust valves 191 and 192 are adapted to selectively permit the exhaust of compressed air from the reservoirs. As shown, the compartments 181 and 182, the passageways 185 and 186, and the lower portions of the reservoirs 183 and 184 are filled with an incompressible liquid medium, such as oil, and valves 193 and 194 are provided for selectively controlling the flow of oil through the passageways and sealing the compartments 181 and 182.

Operation of all of the valves in proper sequence is accomplished by means of a rotatable valve operating member 195 having notches for receiving the ends of suitable valve tappets or stems associated with the valves. The member 195 is of the same general character as the member 159 (Figs. 7 to 13) and is adapted for rotation in accordance with the movements of a suitable control member in the same manner as the member 159, the operating parts and the control member having been omitted from Fig. 15 in order to simplify the drawings.

Although the valves and the operating member 195 are shown only diagrammatically in Fig. 15 it will be understood that inlet valve 188 and exhaust valve 191 are arranged to be opened when the member 195 rotates in the direction of the arrow in Fig. 15, that the inlet valve 187 and the exhaust valve 192 are arranged to be opened when the member 195 rotates in the opposite direction, and that the valves 193 and 194 are provided with double tappets or stems similar, for example, to the stems 156 and 157 of the by-pass valve 145 (Fig. 13) and accordingly are opened upon operation of the member 195 in either direction. All of the valves are closed when the member 195 occupies the neutral position shown in Fig. 15.

In Fig. 15 the member 195 is shown in the neutral position, all of the valves being closed, and the vane 180 being locked, by the oil in the compartments, against movement in either direction. Upon rotation of the member 195 in the direction of the arrow, compressed air is admitted to the reservoir 184 through the valve 188 and oil is forced from the reservoir through the valve 194 into the compartment 182 so as to move the vane 180 in a counterclockwise direction. A corresponding quantity of oil is of course forced from the compartment 181, through the valve 193 and into the reservoir 183, the air above the body of oil in the reservoir being discharged through the exhaust valve 191.

Return of the member 195 to its neutral position permits closure of all of the valves to lock the vane 180 in the position to which it has been operated, and rotation of the member 195 in the opposite direction admits compressed air through the valve 187 to the reservoir 183 whereupon the vane 180 is operated in a clockwise direction, the exhaust of air from the reservoir 184 being permitted through the valve 192. The capacity of the compartments 181 and 182 and the reservoirs 183 and 184 is such that when the vane 180 occupies either of its extreme positions a reserve quantity of oil remains in the bottom of one reservoir and the oil level in the opposite reservoir is slightly below the top of the reservoir.

It will now be apparent from the description of the various embodiments of my invention that the embodiment shown in Figs. 1 to 6 is operated from a source of pressure which develops a substantially steady or constant pressure in a liquid such as oil, as for example, the lubricating pump of an automotive engine, and that the act of returning the valves of the fluid actuator to their neutral or closed positions to lock the actuator in the position to which it has been operated, may at times require the exertion of a small effort upon the control member.

The embodiment shown in Figs. 7 to 14 is illustrated as operated from a pressure source developing, in a liquid such as oil, a varying pressure which is at all times proportional to the resistance encountered, up to the maximum pressure for which the safety valve is set. When the control member is not being actuated, the pressure source is automatically relieved of pressure by by-passing the oil, and the fluid actuator is automatically locked in a position corresponding to the position of the control member. This embodiment may also be adapted for operation from a steady source of pressure, merely by preventing the by-pass valve from opening, for example, by lengthening or extending toward the right (Fig. 13) the portion of the valve 145 which abuts the cup 152 so that the by-pass 147 is maintained closed at all times. With the by-pass thus closed the fluid actuator is automatically locked when operation of the control member ceases.

The embodiment shown in Fig. 15 is, of course, adapted for operation by a steady pressure, but in this case the pressure medium is a compressible gas, such as air, for example, acting upon the oil contained in the fluid actuator. This mechanism will also lock automatically when movement of the control member ceases. Failure of the oil or air pressure system in the various embodiments shown, moreover, does not interfere with the manual operation.

While I have described the various embodiments of my invention as applied to the steering mechanism of an automotive vehicle, it will be apparent that my invention is not limited to this particular application. The invention as disclosed is adaptable to many control mechanisms in which it is desired to operate a driven member by a fluid medium under pressure in accordance with the movement of a selectively movable control member. Furthermore, while I have shown particular embodiments of my invention, it will be understood, of course, that I do not wish to be limited thereto since many modifications may be made, and I, therefore contemplate by the appended claims to cover any such modifications as fall within the true spirit and scope of my invention.

Having thus described my invention, what I claim and desire to secure by Letters Patent is:

1. In combination, a fluid pressure actuator operatively connected with a part to be operated, a plurality of independently operable valves for said actuator normally biased to one of two extreme positions and including operating valve stems arranged in parallel rows, a cylindrical valve member journalled for rotation adjacent the ends of said valve stems and having a plurality of slots therein for receiving the ends of said valve stems, rotation of said cylindrical member in either direction causing the corresponding ends of the slots to engage the associated row of valve stems and operate the valves so as selectively to supply fluid pressure to said actuator in a corresponding direction, and means including a selectively operable part for rotating said cylindrical member to operate said valves and cause said part connected to said actuator to move in accordance with the movement of said selectively operable part.

2. In a power operated mechanism, the combination of a fluid pressure actuator having a part operatively connected to said mechanism and moveable in either of two directions upon the selective admission of fluid pressure to the opposite sides thereof, a continuously driven pump for supplying fluid medium under pressure to said actuator, valve means normally preventing the admission and exhaust of fluid medium on the opposite sides of said part, a separate by-pass valve normally positioned to permit a continuous circulation of fluid medium by said pump, and manually operable means moveable in either of two directions for positively operating said valve means and said separate by-pass valve, initial movement of said means in either direction closing said separate by-pass valve to direct said fluid medium to passages controlled by said valve means and continued movement of said means in either direction effecting selective operation of said valve means to supply fluid medium to one side of said part and permit the exhaust of fluid medium from the opposite side thereof, whereby said part operates said mechanism in a direction corresponding to the movement of said manually operable means.

3. In a control mechanism, the combination of a fluid pressure actuator, a plurality of independently operable valves, means normally biasing said valves to a position in which said actuator is held against movement, said valves being selectively operable from said position to cause movement of said actuator, an operating member for said valves, a manual member, means connecting said manual member to said actuator for effecting manual movement thereof, a pair of arms frictionally engaging said manual member on opposite sides of said connecting means for rotation with said manual member to effect operation of said valve operating member when the frictional force exerted on said arms by said manual member exceeds the biasing force on said valves, means including said connecting means between said manual member and said actuator for varying the frictional force exerted on said arms by said manual member in accordance with the relative movements of said manual member and said actuator whereby said valves are selectively operated to cause the power operation of said actuator closely to follow the operation of said manual member.

4. In a steering mechanism, the combination of a fluid pressure actuator for effecting power operation thereof, a plurality of independently operable valves, means normally biasing said valves to closed positions to lock said actuator against movement, said valves being selectively operable to open positions to cause power operation of said actuator in either of two directions, an operating member for said valves, a steering post having a worm and gear connection to the portion of said mechanism to which said actuator is connected, a pair of friction discs secured to said post adjacent the opposite ends of said worm, arms connected to said valve operating member for respectively engaging said friction discs, said arms and said discs being normally out of frictional driving engagement when said post is in a central position, said post when rotated in either direction being movable axially by the reaction of said gear on said worm to exert a sufficient frictional force between one of said arms and its associated disc to rotate said arm with said post and cause operation of said valves thereby to effect power operation of the mechanism in a corresponding direction, said valves being returned to closed positions by said biasing means whenever the said frictional force decreases due to over travel of said actuator with respect to said post whereby the power operation of said steering mechanism accurately follows the movements of said steering post.

5. In a mechanism having a selectively rotatable control member, a driven member, and a worm and gear driving connection therebetween, the combination of fluid pressure means for operating said driven member, valve means for selectively controlling the supply of fluid pressure to said fluid pressure means, operating means for said valve means including a part mounted for rotation to control said operating means, and means responsive to reaction forces exerted on said worm by said gear when said control member is rotated for selectively establishing a frictional driving connection between said control member and said part to rotate said part selectively with said control member to govern said fluid pressure operating means.

6. In a mechanism having a selectively rotatable control member, a driven member, and a worm and gear driving connection therebetween, the combination of fluid pressure means for operating said driven member, valve means for selectively controlling the supply of fluid pressure to said fluid pressure means, means mounted for rotation in coaxial relation to said control member, means responsive to reaction forces exerted on said control member by said worm and gear connection when said control member is rotated for selectively establishing frictional driving connections between said control member and said coaxially mounted means, whereby said coaxially mounted means is selectively rotated with said control member, and means controlled by rotation of said coaxially mounted means for operating said valve means in accordance with the movement of said control member.

7. In a mechanism having a selectively rotatable control member, a driven member, and a worm and gear driving connection therebetween, the combination of fluid pressure means for operating said driven member, valve means for selectively controlling the supply of fluid pressure to said fluid pressure means, valve operating means including a part mounted for rotation to control said operating means, means responsive to the axial forces exerted on said worm by said gear when said control member is rotated for selectively establishing and disestablishing a frictional driving connection between said control member and said part, whereby said part is selectively rotated by said control member to govern said fluid pressure operating means.

8. In combination, a fluid pressure actuator operatively connected with a part to be operated, a plurality of independently operable valves for said actuator normally biased to one of two extreme positions and including operating valve stems arranged in parallel rows, an operating member journalled for rotation adjacent the ends of said valve stems and having a plurality of transverse slots therein for receiving the ends of said valve stems, rotation of said member in either direction causing the corresponding ends of said slots to engage the associated row of valve stems and operate the valves so as selectively to supply fluid pressure to said actuator in a corresponding direction, and means including a selectively operable part for rotating said operating member to operate said valves and cause said part connected to said actuator to move in accordance with the movement of said selectively operable part.

9. In a control mechanism, the combination of a fluid pressure actuator, a plurality of independently operable valves, means normally biasing said valves to a position in which said actuator is held against movement, said valves being selectively operable from said position to cause movement of said actuator, a manually rotatable member connected to said actuator by a worm and gear connection, valve operating means including a pair of arms respectively disposed in frictional engagement with said manually rotatable member at opposite ends of said worm for rotation with said manually rotatable member to selectively operate said valves when the frictional force exerted on said arms by said manually rotatable member exceeds the force of said biasing means, and means including said worm and gear connection for varying the frictional force exerted on said arms in accordance with the relative movements of said manually rotatable member and said actuator, whereby said valves are selectively operated to cause the power operation of said actuator closely to follow the operation of said manually rotatable member.

10. In a steering mechanism having a selectively rotatable steering element, a rotatable shaft, and a worm and gear connection therebetween, the combination of fluid pressure means for operating said shaft, valve means for controlling the supply of fluid pressure to said fluid pressure means selectively to effect operation of said shaft in either of two directions and to lock said shaft against movement, valve operating means for selectively operating said valve means to govern in accordance with the rotation of said steering element the direction, the speed, and the degree of movement imparted to said shaft by said fluid pressure means, said valve operating means and said steering element including cooperating parts movable in substantially parallel planes and disposed in face to face frictional engagement for providing a driving connection therebetween, one of said parts being movable transversely to said planes in response to reactive forces exerted on said worm by said gear upon rotation of said steering element in either direction to vary the frictional force between said parts.

11. In a mechanism having a selectively rotatable control member, a driven member, and a worm and gear driving connection therebetween, the combination of fluid pressure means for operating said driven member, valve means for selectively controlling the supply of fluid pressure to said fluid pressure means, frictionally driven means mounted for rotation in a plane extending substantially at right angles to the axis of rotation of said control member, means responsive to reaction forces exerted on said control member by said worm and gear connection when said control member is rotated for selectively establishing frictional driving connections between said control member and said frictionally driven means selectively to rotate said driven means with said control member, and means controlled by rotation of said frictionally driven member for operating said valve means in accordance with the movement of said control member.

12. In a mechanism having a selectively rotatable control member, a driven member, and a worm and gear driving connection therebetween, the combination of fluid pressure means for operating said driven member, valve means for selectively controlling the supply of fluid pressure to said fluid pressure means, rotatable means secured against movement axially of said control member and mounted for rotation in planes extending substantially at right angles to the axis of rotation of said control member, means responsive to reaction forces exerted on said worm by said gear when said control member is rotated for selectively establishing frictional driving connections between said control member and said rotatable means selectively to rotate said rotatable means with said control member, and means controlled by rotation of said rotatable means for operating said valve means in accordance with the movement of said control member.

13. Power mechanism for augmenting the turning movement of manually controlled steering apparatus and the like in which said apparatus is provided with a manually rotatable member subjected to a thrust in both directions of rotation, comprising an element fixed upon said member, a collar loosely associated with said element, means for clutching said collar to said element upon the application of thrust, a valve, an arm for actuating said valve upon the application of thrust to said member, a power unit associated with and manually controlled by said valve and including a cylinder having an inlet at each end for fluid under pressure and a piston adapted to reciprocate between said inlets and connected to the steering apparatus for relieving the operator of the manual effort and physical fatigue encountered in steering a power propelled vehicle.

14. Power mechanism for assisting the turning movement in either direction of manually controlled steering apparatus for vehicles having a steering wheel and shaft, a worm on said shaft, a gear segment in mesh with said worm and a connection from the segment to the wheels for turning and steering the wheels of the vehicle, comprising a member fixed upon the shaft, a pair of collars loose upon the shaft and positioned adjacent the opposite sides of said member, a thrust bearing adjacent each collar, means for clutching either of said collars between said member and its adjacent thrust bearing whereby said collar is caused to rotate with said member and shaft upon the manual turning of the steering wheel, power means connected to the steering apparatus and including a fluid supply, valve mechanism for controlling the fluid supply, an interconnection between said collars and valve mechanism whereby the valve is actuated to supply fluid and power to the steering apparatus during the manual turning of the steering wheel, and means for returning the valve mechanism to inoperative position and disconnecting power to the steering apparatus when the operator ceases his manual turning effort.

15. Vehicle steering apparatus comprising a steering wheel, a worm operated thereby, thrust bearings associated with said worm, tooth means operated by the worm for steering the vehicle, power means connected to said means to assist in its movement, members frictionally engageable with said thrust bearings by the thrust of the worm and rotatable therewith upon manual movement of the steering wheel, means connected with said members for actuating the power means, and means for shutting off the power upon discontinuance of said worm thrust.

16. In combination with steering apparatus having a steering wheel and rod and a manually operated worm, thrust bearings for said worm, power means for assisting in the operation of the apparatus, and actuating means for said power means and controlled by the thrust of the worm resulting from manual operation thereof, said actuating means being adapted to be moved into clutching engagement with either of said thrust bearings.

17. In combination with a vehicle steering apparatus having a steering wheel and rod, a worm secured upon the rod, thrust bearings for said worm, power means assisting in the operation of said apparatus, automatic means adapted to be clutched to either of said thrust bearings and controlled by the thrust of the worm upon manual operation of the steering wheel for actuating the power means, and automatic means for discontinuing the power upon cessation of said worm thrust.

18. Power mechanism for augmenting the manual turning movement in either direction of manually controlled steering apparatus and the like and in which said apparatus is provided with a steering shaft and a worm fixed thereon and subjected to a thrust when manually rotated in either direction, thrust bearings on said shaft, a member loose upon the shaft adjacent each thrust bearing and adapted to be moved into contact with an element of its respective thrust bearing whenever the steering shaft is rotated and the worm is subjected to end thrust, a power unit to which fluid under pressure is supplied and which power unit is connected to the steering apparatus for assisting the operator in the turning movement of the steering shaft, valve mechanism for controlling the fluid supply, interconnecting means between said valve and members loose upon the shaft responsive to the manual turning and control by the operator, and means for automatically and positively disconnecting the power unit upon the operator ceasing to turn the steering apparatus.

RASMUS M. HVID.